(12) United States Patent
Hocking

(10) Patent No.: US 6,792,720 B2
(45) Date of Patent: Sep. 21, 2004

(54) SEISMIC BASE ISOLATION BY ELECTRO-OSMOSIS DURING AN EARTHQUAKE EVENT

(75) Inventor: Grant Hocking, Alpharetta, GA (US)

(73) Assignee: GeoSierra LLC, Atlanta, GA (US)

( * ) Notice: Subject to any disclaimer, the term of this patent is extended or adjusted under 35 U.S.C. 154(b) by 40 days.

(21) Appl. No.: 10/236,884

(22) Filed: Sep. 5, 2002

(65) Prior Publication Data

US 2004/0045230 A1 Mar. 11, 2004

(51) Int. Cl.[7] .............. E02D 27/34; E02D 3/11; G01V 7/00
(52) U.S. Cl. .............. 52/1; 52/167.1; 52/741.3; 52/DIG. 12; 52/741.11; 405/37; 405/302.4; 405/302.5; 702/15
(58) Field of Search ............ 52/1, 167.1, 741.1, 52/741.11, 741.3, DIG. 12; 405/37, 302.4, 302.5; 705/15

(56) References Cited

U.S. PATENT DOCUMENTS 3,915,826 A * 10/1975 Franceschini ............... 204/515
4,960,524 A * 10/1990 Inculet et al. ............... 204/513
5,396,744 A * 3/1995 Mosley ....................... 52/169.1
5,927,907 A * 7/1999 Shiraishi .................... 405/258.1
6,308,135 B1 * 10/2001 Hocking ........................ 702/2

FOREIGN PATENT DOCUMENTS

JP          5-140955     *  5/1993   ........... E02D/27/34
WO       WO 01/27396    *  4/2001   ........... E02D/27/34

* cited by examiner

Primary Examiner—Robert Canfield
(74) Attorney, Agent, or Firm—Smith, Gambrell & Russell, LLP

(57) ABSTRACT

A method and system of isolating a structure and soil mass from earthquake induced vibration by inducing soil liquefaction beneath a structure during an earthquake event, by monitoring local seismic precursor events, such as early arrival ground motion using an accelerometer, predicting the onset of a major earthquake tremor and energizing conductors in the ground by a dc power source for moving the ground water by electro-osmosis towards a suitable isolation layer, whereby raising the pore water pressure in the isolation layer and thus preferentially inducing localized soil liquefaction of the particular isolation layer during the earthquake event and thus isolating the structure and soil above the particular soil horizon from the upward propagating shear wave ground motions arising from the earthquake event.

24 Claims, 5 Drawing Sheets

SEISMIC BASE ISOLATION BY ELECTRO-OSMOSIS DURING AN EARTHQUAKE EVENT

TECHNICAL FIELD

This invention relates to seismic base isolation of a structure or soil mass from the vibratory motion generated during an earthquake, and more particularly to the preferential inducement of localized soil liquefaction of a particular isolation layer in the soil horizon beneath the structure by applying an electro-osmotic gradient to the saturated soil during the earthquake event and thus raising the pore water pressure to induce localized soil liquefaction within a particular isolation layer in the soil horizon which thus reduces the upward propagation of the earthquake induced shear wave ground motions to the overlying structure.

BACKGROUND OF THE INVENTION

Earthquakes are caused by the resultant relative slippage of the earth crust, generally along or near major tectonic plate boundaries. In certain parts of the world, continuous differential movement occurs between one section of the earth's crust and an adjacent one, causing an accumulation of strain at the boundary. When the stresses caused by this strain accumulation exceed the strength of the earth's materials, a slip occurs between two portions of the earth's crust and tremendous amounts of energy are released. This energy propagates outward from the focus or origin of the earthquake in the form of body and surface elastic stress waves.

The energy released during an earthquake event is transmitted through the earth's crust in the form of body and surface seismic waves. The body waves are composed of P-(compression) waves and S-(shear) waves, with the P-wave traveling significantly faster than the S-wave. The surface waves of most interest are the Rayleigh wave and the Love wave. The Love wave travels faster than the Rayleigh wave. The total energy transported is represented almost entirely by the Rayleigh, the S- and the P-waves, with the Rayleigh wave carrying the largest amount of energy, the S-wave an intermediate amount, and the P-wave the least. The velocity of the P-wave is almost double that of the S-wave, and the velocity of the S-wave is only slightly greater than the Rayleigh wave.

At some distance from an earthquake disturbance a particle at the earth's surface first experiences a displacement in the form of an oscillation at the arrival of the P-wave followed by a relatively quiet period leading up to another oscillation at the arrival of the S- and Rayleigh waves. These events are referred to as the minor tremor and the major tremor at the time of arrival of the Rayleigh wave. The body and surface waves are monitored during an earthquake to gauge the earthquake's intensity.

Earth ground motions experienced during an earthquake are actually quite complex due to the variation in the earth's crust, from strong stiff bedrock to soft weak soils. Considerable energy can be transmitted through the bedrock, and it appears that in many cases the main forces acting on soil elements in the field during earthquakes are those resulting from the upward migration of shear motions from the underlying rock formations. Although the actual wave pattern may be very complex, the resulting ground motion imposed on the soil and the overlying structure are predominantly from the upward propagation of the S-wave components from the underlying bedrock. Deposits of thick soft soils can give rise to amplification of these ground motions in particular in the long period (low frequency) content of the earthquake induced shaking. Such amplification of earthquake induced ground motions can cause extensive damage to buildings, bridges, pipelines, embankments, dams, slopes, and other structures and works constructed on soft soil deposits.

The factors that effect the amplification of earthquake induced ground motions are soil type, grain size distribution, compactness of the soil, thickness of the soil deposit, depth to groundwater, and the magnitude and number of the strain reversals. Deposits of soft soils, such as silts and clays are most likely to amplify ground motions during an earthquake Structures constructed on such soils can be extensively damaged by even a moderate size earthquake. Two recent earthquakes, the 1985 Michoacan (Mexico) and the 1989 Loma Prieta (Calif.), highlight the extensive earthquake induced damage to structures located on soft soil deposits. The 1985 Michoacan earthquake caused only moderate damage in the vicinity of its epicenter but caused extensive damage to structures located on a thick deposit of soft silts and clay some 350 km away in Mexico City. Likewise, the 1989 Loma Prieta earthquake caused minor damage in the vicinity of its epicenter but caused moderate to extensive damage to structures located on the San Francisco Bay mud some 100 km away.

Conventional seismic isolation systems to minimize or prevent damage to a structure by isolating the structure from ground motions during an earthquake consist of the following:

1) sliding bearings with energy absorbing properties to isolate the structure from horizontal earthquake induced ground motions, such as lead rubber, steel neoprene/rubber and fiber reinforced elastomer,
2) sliding bearings with fluid dampers to both isolate the structure from earthquake induced ground motion and modify the structural response to minimize damage,
3) passive mass damping systems consisting of a pendulum suspended weight and associated dampers to absorb vibratory energy and minimize damage to the structure,
4) active mass damping systems consisting of a sensor and computer controlled movement of a mass to minimize vibration and damage to the structure,
5) pneumatic or fluidized foundation isolation system to reduce earthquake induced ground motions being transmitted to the structure.

The above methods have had mixed success in minimizing damage and vibrations to a structure during an earthquake. The passive and active mass damping systems have been shown to be successful during strong winds and minor earthquakes. Bearing isolation systems have in some circumstances, e.g. the 1994 Northridge (Calif.) earthquake, demonstrated to provide poor if any base isolation of the structure from the earthquake induced ground motion. The mass damping systems have demonstrated some protection of a structure due to earthquake vibrations; however, they are expensive, and difficult to implement in existing structures. The energy absorbing sliding bearing systems can be implemented in existing structures; however, their performance during actual earthquake events appear limited in isolating the structure from earthquake induced ground motions and minimizing structural damage.

The main forces acting on soil elements in the field during earthquakes are those resulting from the upward migration of shear motions from the underlying rock formations.

Although the actual wave pattern may be very complex, the resulting repeated and reversing shearing deformations, imposed on the soil by the S-wave components are the principal cause of a phenomenon known as liquefaction, which occurs in saturated fine sand, silty sand and silt deposits. When these soil deposits are subjected to repeated shear strain reversals, the volume of the soil decreases with each cycle, i.e. the soil contracts, and due to the lack of drainage of these saturated soils, the soil pore water pressure rises. As the soil pore water pressure rises, the grain to grain contact pressure becomes smaller, until eventually the grain to grain contact pressure drops to zero and the soil loses all of its shear strength and acts like a fluid. Liquefaction can occur in loose saturated fine sands, silty sands and silts as a result of earthquakes, blasting or other shocks.

The factors that effect the occurrence of liquefaction are soil type, grain size distribution, compactness of the soil, soil permeability, and the magnitude and number of the strain reversals. Fine cohesionless soils, fine sand or fine cohesionless soils containing moderate amounts of silt are most susceptible to liquefaction. Uniformly graded soils are more susceptible to liquefaction than well graded soils, and fine sands tend to liquefy more easily than coarse sands or gravelly soils. Moderate amounts of silt appear to increase the liquefaction susceptibility of fine sands; however, fine sands with large amounts of silt are less susceptible, although liquefaction is still possible. Recent evidence indicates that sands containing moderate amounts of clay may also be liquefiable.

Current methods for evaluating the liquefaction potential of soils consist of two basic approaches, laboratory tests and in situ tests. The laboratory methods require undisturbed soil samples which are difficult to impossible to obtain. The laboratory test methods involve cyclic triaxial, cyclic direct shear and cyclic torsional triaxial tests All of these tests apply a cyclic shear stress reversal upon the soil specimen. At the present time, there is not a method for obtaining undisturbed samples, in which the in situ stress state, void ratio or structure have been preserved in cohesionless soils. Therefore, laboratory methods are considered only qualitative tests in assessing the potential of a soil to liquefy. The in situ methods currently consist of five (5) types, with four (4) of the methods; 1) the Standard Penetration Test (SPT); 2) the Cone Penetration Test (CPT); 3) the Piezocone Penetration Test (PCPT) and 4) the Seismic Waves Test (SWT) being indirect empirical methods and the fifth method an in situ cyclic stress reversal test being a direct in situ measurement of a soil's tendency to liquefy. The present in situ methods are capable of determining whether a particular soil horizon has the potential to liquefy and under what earthquake ground motions it will most likely liquefy.

Since shear waves can not propagate through a fluid, a liquefied soil horizon will act as a seismic isolation barrier and stop/inhibit the upward propagation of earthquake induced shear wave ground motions to overlying soils and structures. To avoid liquefaction related damage to the surface the liquefied soil horizon needs to be at a depth greater than 5 times its liquefiable thickness, Ishihara (1985) and Youd & Garris (1995).

Electro-osmosis involves the application of a direct current (dc) between electrodes inserted in the saturated soil, that gives rise to pore fluid movement from the source electrodes towards the sink electrodes and thus modifies the soil pore water pressures. Electro-osmosis has been used in applications such as 1) improving stability of excavations, 2) decreasing pile driving resistance, 3) increasing pile strength, 4) stabilization of soils by consolidation or grouting, 5) dewatering of sludges, 6) groundwater lowering and barrier systems, 7) increasing petroleum production, 8) removing contaminants from soils, and 9) preventing soil liquefaction during an earthquake event. Electro-osmosis uses a dc electrical potential difference applied across the saturated soil mass by electrodes placed in an open or closed flow arrangement. The dc potential difference sets up a dc current flowing from the source electrodes to the sink electrodes. In most soils the soil particles have a negative charge. For those negatively charged soils, the source electrodes is the anode electrode, the sink electrode is the cathode electrode, and ground water migrates from the anode electrode towards the cathode electrode. In other soils, such as calcareous soils (e.g. limestone), the soil particles carry a positive charge. In those positively charged soils, the source electrode is the cathode electrode, the sink electrode is the anode electrode, and ground water migrates from the cathode electrode towards the anode electrode.

An "open" flow arrangement at the electrodes allows an ingress or egress of the pore fluid. Due to the electrically induced transport of pore water fluid, the soil pore water pressures are modified to enable excavations to be stabilized or pile driving resistance to be lowered. Electro-osmosis is not used extensively due to the high cost of maintaining the dc potential over long periods of time and the drying out and chemical reactions that occur if the system is activated for long periods of time.

Monitoring ground motion and activating safety devices or active mass damping systems prior to the arrival of a major earthquake can in some cases reduce damage. Such a forecasting system can be used to close gas valves or cutoff electricity to the effected area. Such systems may include a tuned pendulum system, that upon the onset of certain ground motion magnitude and frequency, the pendulum motion sets off an alarm, activates a switch or closes a gas valve prior to the arrival of the major tremor of the earthquake. Alternatively, a heavy sliding or rotating mass can be used to activate a similar switch, contact or value, by sizing the mass that upon experiencing certain ground motions the mass slides or rotates and activates a switch, contact or closes a valve prior to the arrival of the major destructive earthquake tremor.

SUMMARY OF THE INVENTION

The present invention provides a method and system for seismically isolating a structure or works from earthquake induced ground motions during an earthquake event.

Particularly, the present invention provides a seismic monitor that monitors the earth's movement and predicts the onset of an earthquake event. Based on that prediction, the methods and system of the present invention controls a switch that activates a dc potential difference across an array of electrodes buried in the ground beneath the structure and below the water table. The current flow by means of electro-osmosis raises the pore water pressure in a particular predetermined isolation layer of the soil horizon to such an extent that the soil horizon preferentially temporarily liquefies within that isolation layer during the earthquake event. The liquefied isolation layer of the soil horizon isolates the overlying soil and structure from the upward propagating earthquake induced shear wave ground motions. The electrodes are spatially located in the saturated soil beneath the structure to define the size of the isolation layer and to induce ground water flow towards the isolation layer of the soil horizon with the sink electrodes located in or adjacent to the isolation layer of the soil horizon. The spatial locations of the electrodes and the applied dc potential difference will vary depending on the soil conditions and the structure, but the dc potential needs to be sufficiently effective to raise the pore water pressure within the particular isolation layer of the soil horizon sufficiently high to ensure the soil horizon liquefies in the isolation layer during the earthquake event.

The particular isolation layer of the soil horizon selected for induced liquefaction is identified from in situ tests and the thickness of the liquefied isolation layer of the soil horizon is established by the vertical spatial location of the electrodes. The vertical thickness of the liquefied isolation layer is selected to be less than $\frac{1}{5}^{th}$ (20%) of the depth of the liquefied isolation layer to ensure liquefaction related surface damage does not occur. The potential isolation layer of the soil horizon is selected as the most susceptible soil in the formation that will liquefy and is conducive to electo-osmosis. The isolation layer of the soil horizon is also selected based on its low or minimal cohesive strength.

Particularly, the method of the present invention raises the pore water pressure in the isolation layer of the soil horizon by activating an electro-osmosis gradient towards the isolation layer to ensure that the isolation layer of the soil horizon liquefies during the earthquake event and thus the liquefied isolation layer seismically isolates the overlying soil and structure from the upward propagating earthquake induced shear wave ground motions. The present invention can be installed for existing structures with minimal disruption and can reduce the damaging vibrations to the structure and its foundations by isolating the structure and foundations from the earthquake event.

While the liquefied isolation layer, well below the overlying structure, provides a high degree of protection for the overlying structure, in some circumstances electro-osmosis may also be used directly beneath the overlying structure and above the isolation layer to inhibit soil liquefaction directly beneath the overlying structure to maintain a solid soil foundation zone during the earthquake event. Inhibiting soil liquefaction directly beneath the overlying structure during an earthquake event is described in commonly owned U.S. Pat. No. 6,308,135. Therefore, the present invention contemplates the combination of inhibiting soil liquefaction directly beneath the overlying structure to maintain a solid soil foundations zone while at the same time inducing soil liquefaction in an isolation layer at a greater depth in order to isolate the overlying soil and structure from the upward propagating earthquake induced shear wave ground motions.

A seismic monitor can consist of a variety of devices provided they can predict the onset of major shear deforming ground motions associated with the major earthquake tremor from either early time arrival of higher frequency ground motions or the onset of strong ground motions. The seismic monitor may comprise an accelerometer connected to a computer running a predictive algorithm to activate the switch if ground motions of certain magnitude and frequency are experienced. The seismic monitor may also comprise a pendulum tuned to either activate or deactivate a contact if ground motions of certain magnitude and frequency are experienced. The seismic monitor may further comprise a sliding or rotating mass of sufficient mass to activate or deactivate a contact if ground motions of a certain magnitude and frequency are experienced. The seismic monitor in all cases is designed to monitor ground movement and based on that ground movement predict the onset of a major earthquake tremor. Such seismic monitors are fully disclosed in commonly owned U.S. Pat. No. 6,308,135.

When the seismic monitor has predicted the onset of a major earthquake tremor, the seismic monitor actuates a switch that connects the dc power source to an array of electrical electrodes in the saturated ground, to induce ground water flow from the source electrodes to the sink electrodes and raise the pore water pressure in a particular soil horizon sufficiently high to ensure the isolation layer of the soil horizon liquefies during the earthquake event. The seismic monitor's prediction of a major earthquake tremor generally only precedes the major earthquake tremor by a few seconds, so the dc power source must be capable of energizing the electrodes within this time frame. Such dc power sources may include lead acid batteries, a fly wheel generator, a quick start gas or diesel powered generator, or a combination thereof. Based on empirical data, at least 7.5 watts per square foot of the overlying structure is typically required to induce soil liquefaction in the isolation layer.

Upon energizing of the electrodes a timer is also activated. The timer is set to disengage the electrodes from the dc power source only after sufficient time to ensure the electrodes remain energized throughout even the longest previously recorded earthquake duration. Upon de-energizing the electrodes, the system is reset, and the seismic monitor can re-activate and reenergize the electrodes in the event of following earthquake tremors. The dc power source needs to be of sufficient capacity or re-chargeable to energize the electrodes at the power requirements and duration to ensure the isolation layer of the soil horizon remains in a liquefied state during the earthquake event.

Following the earthquake event, the potential difference applied across the buried electrodes can be reversed to quickly dissipate the excess pore water pressures generated within the liquefied isolation layer of the soil horizon. During this potential difference reversal, water is extracted from the original source electrodes/water supply wells to hasten the dissipation of the pore water pressures.

DETAILED DESCRIPTION OF THE PREFERRED EMBODIMENTS

Figure 1:
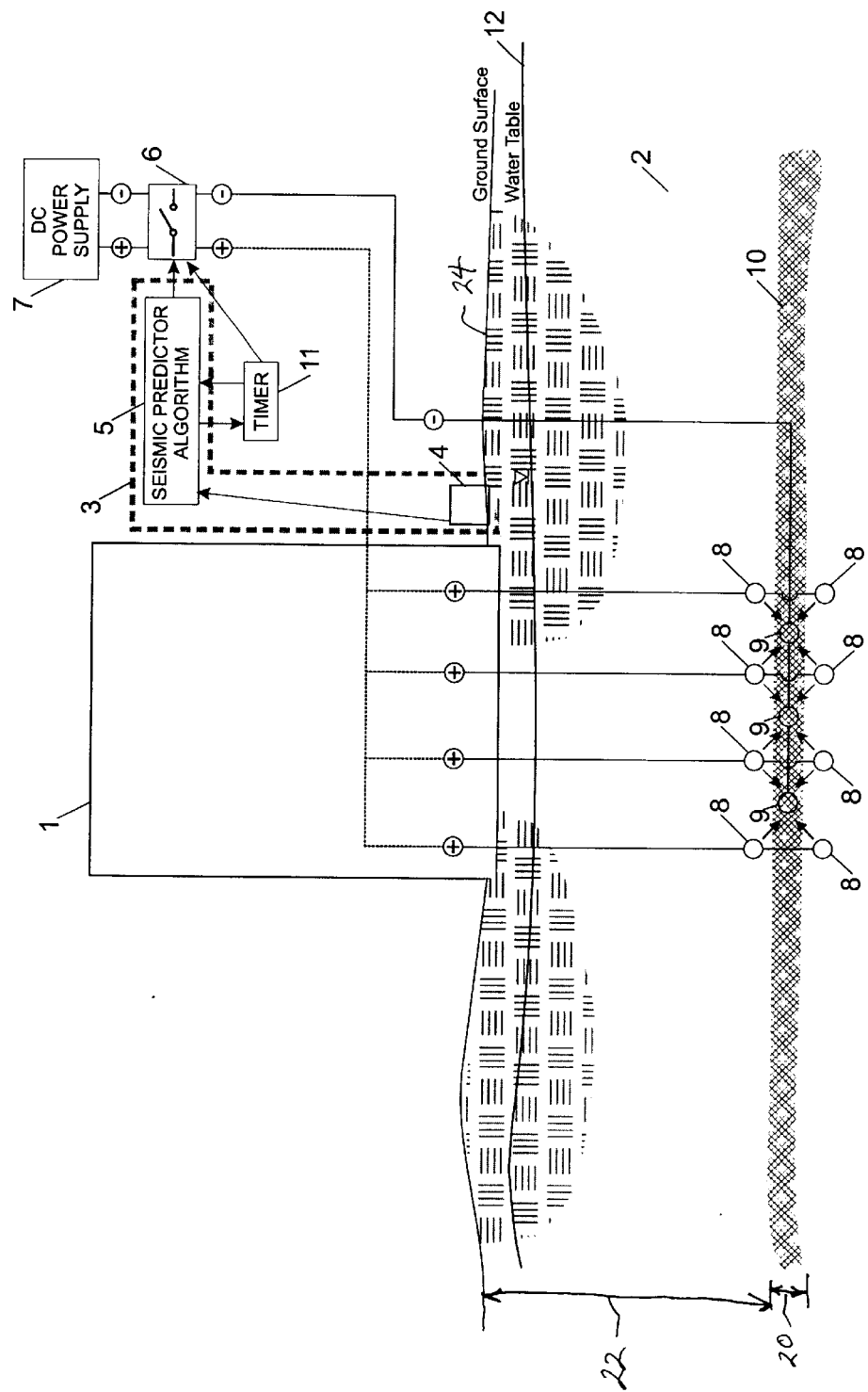
FIG. 1 is a cross sectional view showing one form of the invention for raising the pore water pressure in a particular isolation layer of the soil horizon beneath a structure during an earthquake event.

The present invention provides a method and system for seismically isolating a structure or works from earthquake induced ground motions. The method and system of the present invention employes a seismic monitor which activates a electro-osmosis system in the sub-surface saturated soils well beneath the structure. The electro-osmosis system raises the pore water pressure within a particular isolation layer of the soil horizon to ensure that soil horizon within that isolation layer liquefies during the earthquake event and thus isolates the overlying structure from the earthquake induced upward propagating shear wave ground motions. One form of the invention is illustrated in cross section in FIG. 1, with a structure 1 constructed on a saturated soil 2 which is prone to amplify earthquake induced ground motions. A seismically triggered switch 3 comprises an accelerometer 4 and predictor algorithm 5 running on a computer. The accelerometer 4 engages the ground surface 24 in order to sense any movement of the ground surface 24. The predictor algorithm 5 monitors the accelerometer output and predicts the onset of a major earthquake tremor from early arrival ground motion from minor earthquake tremors. In addition to the accelerometer 4 and predictor algorithm 5, The seismically triggered switch 3 may alternatively comprise a pendulum tuned to either activate or deactivate a contact if ground motions of certain magnitude and frequency are experienced. The seismically triggered switch 3 may also comprise a sliding or rotating mass of sufficient mass to activate or deactivate a contact if ground motions of a certain magnitude and frequency are experienced. The seismically triggered switch 3 in all cases is designed to monitor ground movement, and based on that ground movement, to predict the onset of a major earthquake tremor. The arrangement and operation of the seismically triggered switch 3 is disclosed in greater detail in commonly owned U.S. Pat. No. 6,308,135.

The output of the predictor algorithm 5 is connected to a switch 6 that connects a dc power source 7 to an array of electrical horizontal conductors, both positive source conductors 8 and negative sink conductors 9 positioned in and around a particular isolation layer 10 of the soil horizon which is susceptible to liquefaction. The conductors 8 and 9 remain energized throughout the major earthquake tremor by the use of a timer 11 which is activated by the seismically triggered switch 6. The timer 11 de-energizes the conductors 8 and 9 after an elapsed time and re-sets the switch 6 and the algorithm 5, so that the system can be re-triggered in the event of a later earthquake or tremor.

With respect to the array of electrical conductors, the positive source conductors 8 are connected to the positive terminal of the dc power source 7, and the negative sink conductors 9 are connected to the negative terminal of the dc power source 7. The positive source conductors 8 are located above and below the isolation layer 10, and the negative sink conductors 9 are located within the isolation layer 10. When the dc power source 7 is connected to the conductors 8 and 9, the ground water flows from the positive source conductors 8 towards the negative sink conductors 9 whereby raising the soil pore water pressure in the isolation layer 10 of the soil horizon. The increased soil pore water pressure within the isolation layer 10 preferentially induces liquefaction of the soil within the isolation layer 10. The liquefied isolation layer 10 beneath the structure 1 thus isolates the structure 1 and the soil 2 directly beneath the structure 1 from the upward propagating earthquake induced shear wave ground motions.

With continuing reference to FIG. 1, the horizontal positive source conductors 8 are spaced vertically from each other to define a thickness 20 for the isolation layer 10. As can be seen in FIG. 1, the isolation layer 10 is located a distance 22 below the ground surface 24. In order to assure proper isolation by the isolation layer 10 and to avoid liquefaction related damage to the surface and overlying structure 1, the thickness 20 of the isolation layer 10 is preferably less than 20% of the depth 22 of the isolation layer 10.

Figure 2:
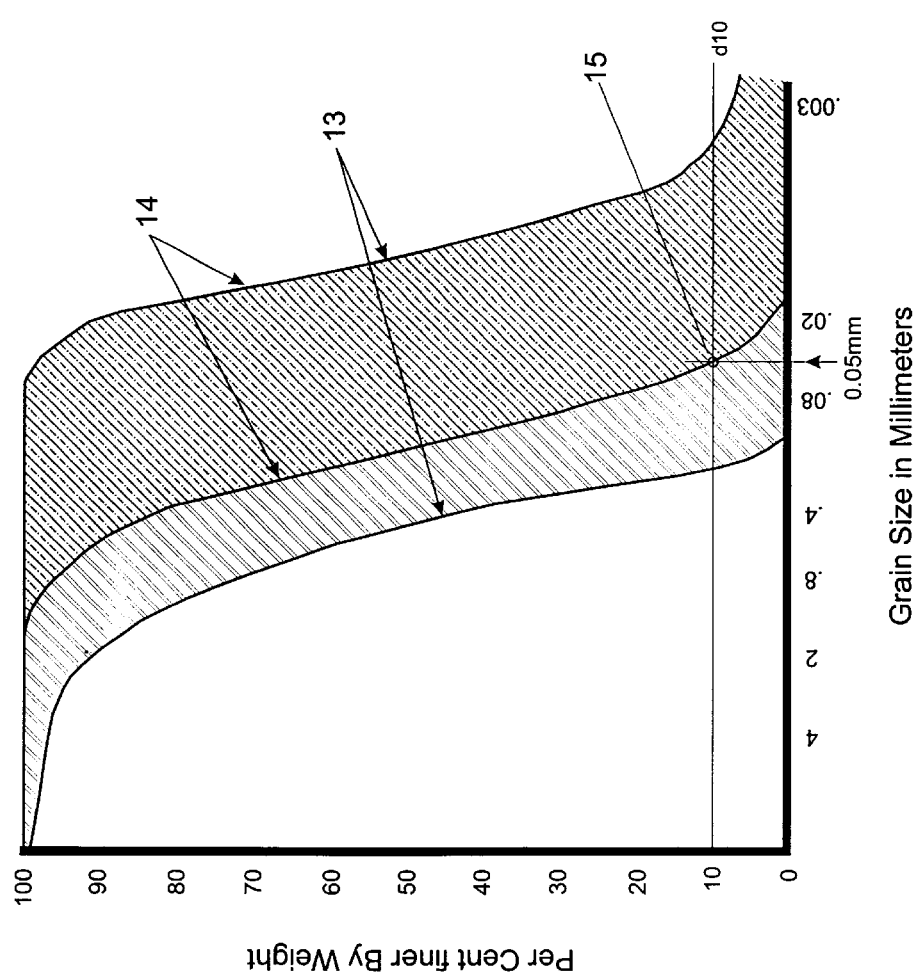
FIG. 2 is a grain size distribution envelope of a range of soils applicable to the current invention.

The present invention is applicable to an isolation layer 10 consisting of fine grained saturated soils, such as fine sands, silty sands, silts and clayey soils. The grain size distribution envelope of soils susceptible to liquefaction are shown in FIG. 2. The soils with a grain size distribution that lies within the envelope 13 are susceptible to soil liquefaction during an earthquake event. The soils applicable to electro-osmosis and susceptible to soil liquefaction during an earthquake event are generally contained in the grain size distribution envelope 14. The present invention is applicable to these soils which are classified as d10 (10% finer) being less or equal to a grain size of 0.05 mm as shown by 15 in FIG. 2. That is, 10% by weight of the soil has a grain size equal to or less than 0.05 mm. The particular soil horizon 10 needs to be susceptible to liquefaction, whereas soil 2 does not necessarily need to be readily liquefiable.

Figure 3:
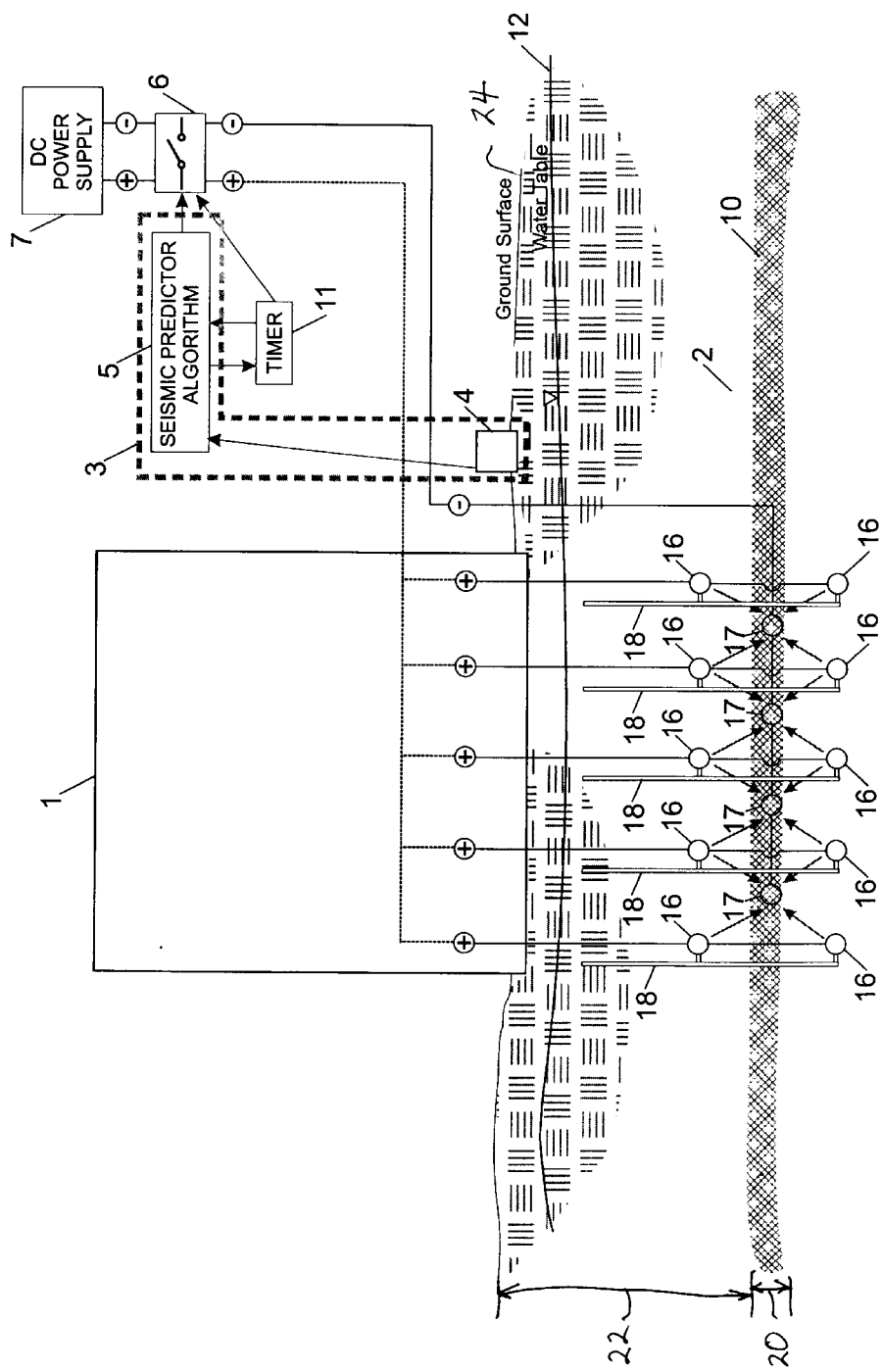
FIG. 3 is a cross sectional view showing another form of the invention with the source electrodes (e.g. anode electrodes) also being water supply wells for raising pore water pressures in a particular isolation layer of the soil horizon beneath a structure during an earthquake event.
Figure 4:
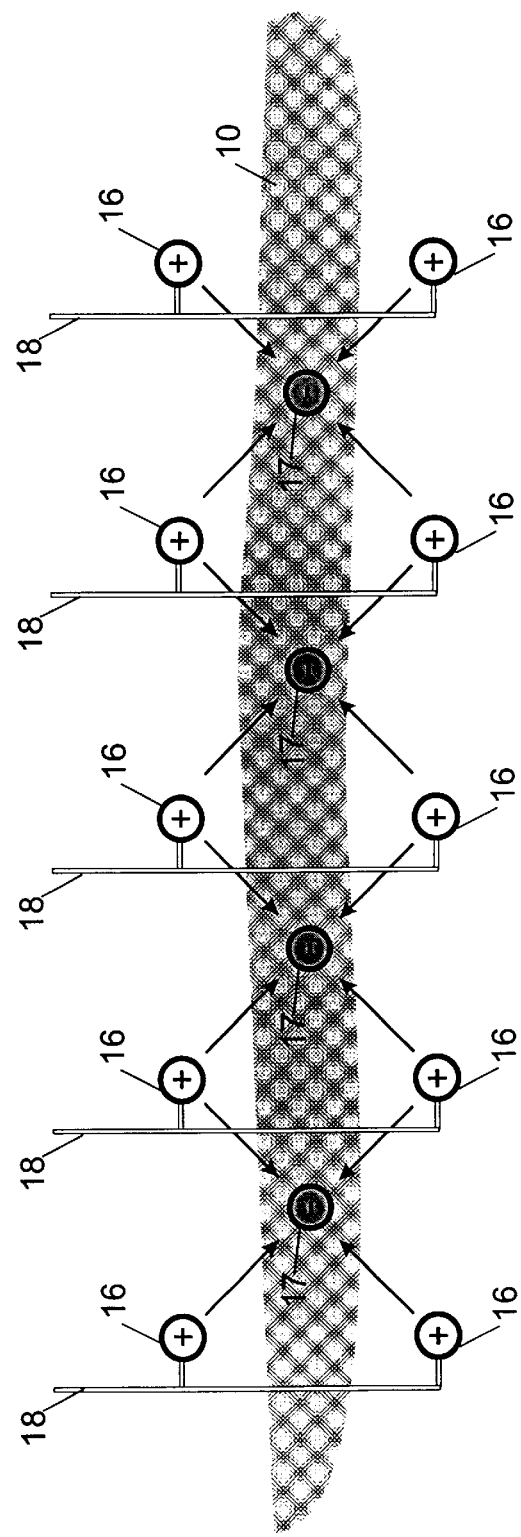
FIG. 4 is a cross-sectional view of source electrodes/supply wells (e.g. anode electrodes) and sink electrodes (e.g. cathode electrodes) as given in FIG. 3.

Referring now to FIG. 3 and FIG. 4 a further embodiment is shown in which the parts corresponding to those in FIG. 1 are identical and similarly numbered with the exception of the electrical conductors, positive source conductors 16 and negative sink conductors 17. Particularly, the source conductors 16 are located and connected to water supply wells 18. In this form of the invention, the ground water is driven by the electro-osmotic gradient from the source conductors 16 towards the sink conductors 17 located in the isolation layer 10 of the soil horizon. The water supply wells 18 supply additional water to the source conductors 16 to assist in raising the pore water pressure in the isolation layer 10 of the soil horizon. The soil pore water pressure in the isolation layer 10 of the soil horizon beneath the structure will be most effectively increased by this arrangement to result in the preferential liquefaction of the isolation layer 10 of the soil horizon during a moderate to large earthquake event. The temporary liquefaction of the isolation layer 10 of the soil horizon during the earthquake event results in the isolation layer 10 of the soil horizon acting like a fluid, and thus upward propagation of earthquake induced shear ground motions are not transmitted through this liquefied isolation layer 10, and the overlying structure 1 is isolated from such ground motions. The water supply wells 18 are connected to the source conductors 16, which are porous and are able to transmit the necessary volumes of water required to ensure an adequate pore water pressure rise in the isolation layer 10 to induce liquefaction within this soil horizon.

In order to achieve adequate liquefaction of the isolation layer 10 and thereby achieve adequate isolation of the overlying structure 1 from the upwardly propagating shock waves from an earthquake, a sufficient amount of electrical energy must be imparted to the isolation layer 10. Experimental results indicated that at least 7.5 watts per square foot of space occupied by the overlying structure 1 is required.

Figure 5:
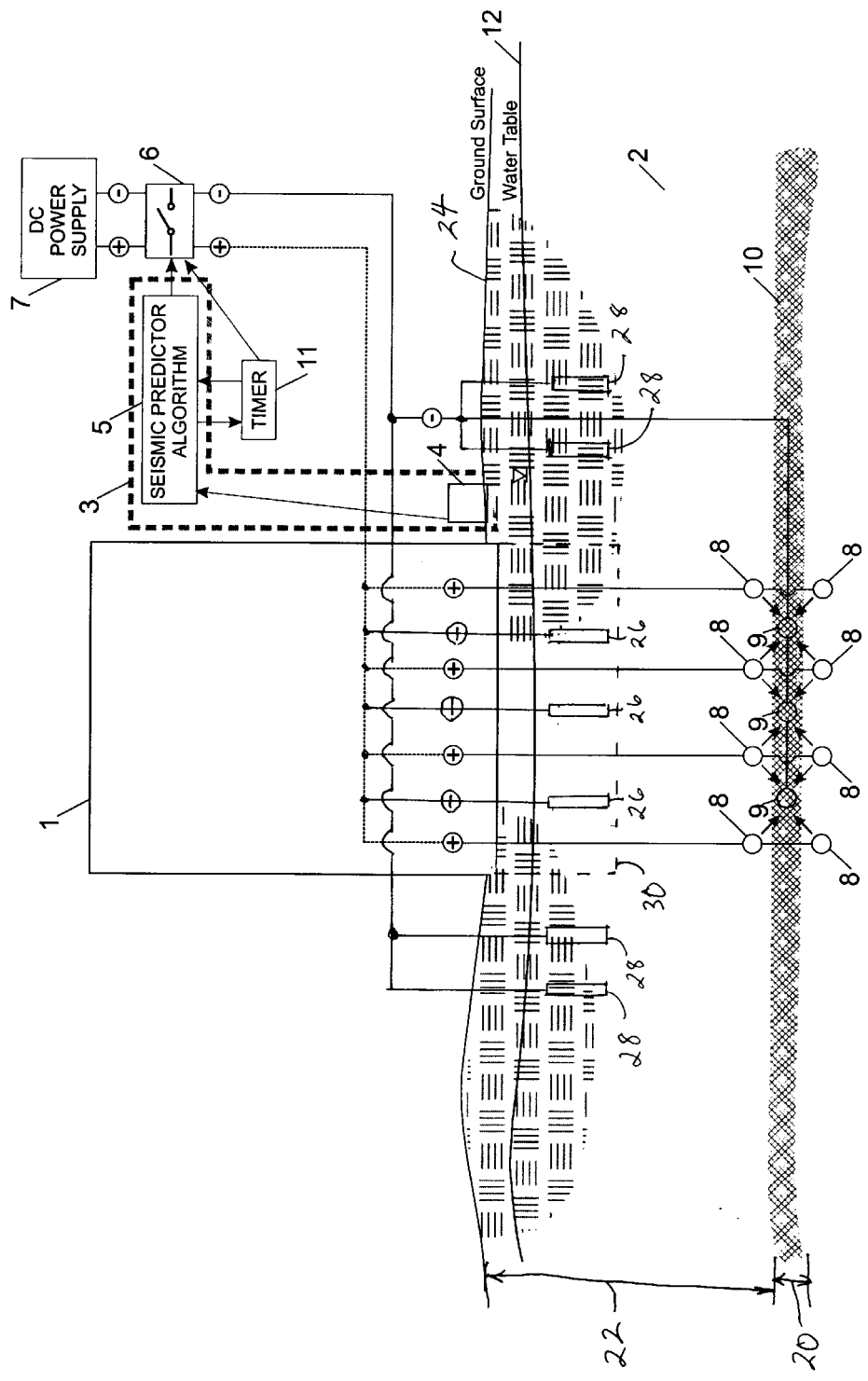
FIG. 5 is a cross sectional view showing another form of the invention for raising the pore water pressure in a particular isolation layer of the soil horizon well beneath a structure during an earthquake event while at the same time lowering the pore water pressure directly under the structure.

Turning to FIG. 5, a further embodiment of the present invention is shown. The embodiment of the present invention shown in FIG. 5 is similar in most respects to the embodiment shown in FIG. 1, except that a second array of electrical conductors including positive source conductors 26 and negative sink conductors 28 are located in the soil horizon below the water table 12 and above the isolation layer 10. Particularly, the positive source conductors 26 are located in the soil horizon below the water table 12, above the isolation layer 10, and directly beneath the structure 1. On the other hand, the negative sink conductors 28 are located below the water table 12, above the isolation layer 10, and outboard of the structure 1. Consequently, when the dc potential from the dc power supply 7 is connected to the conductors 26 and 28, ground water flows from the positive source conductors 26 toward the negative sink conductors 28 thereby lowering the soil pore water pressure in the soil 2 directly beneath the structure 1. The reduced soil pore water pressure beneath the structure 1 inhibits liquefaction of the soil 2 in response to shock waves directly beneath the structure 1 thereby maintaining a firm soil foundation zone 30 under the structure 1 during an earthquake event. The soil foundation zone 30 firmly supports the structure 1 while the isolation layer 10 isolates the foundation zone 30 and the overlying structure 1 from upwardly propagating shock waves.

There is a plurality of arrangements and positions of the electrical conductors and water supply wells to achieve the desired soil pore water pressure increase by electro-osmosis in the isolation layer beneath the structure founded on saturated soils. The above arrangements are shown as illustrations of various forms of the invention. The present invention, therefore, is well adapted to carry out the objects and attain the ends and advantages mentioned as well as others inherent herein. While presently preferred embodiments of the invention are given for the purpose of disclosure, numerous changes in the details of construction, arrangement of parts, and the steps of the process will readily suggest themselves to those skilled in the art and which are encompassed within the spirit of the invention and the scope of the appended claims.

I claim:

1. A method of seismically isolating a structure on a ground surface during an earthquake event comprising:
    (a) monitoring the movements of the earth adjacent the structure;
    (b) from the movements of the earth, predicting the onset of an earthquake event; and
    (c) in response to the prediction of an earthquake event, connecting a source of dc power to an array of electrical conductors located in the soil beneath the structure and below the ground water table so that in response to connecting the dc power to the electrical conductors in the soil, the ground water moves towards an isolation layer, raising the pore water pressure within the isolation layer and thus causing preferential earthquake induced liquefaction of the isolation layer which thus isolates the overlying structure from the upwardly propagating earthquake induced ground motions.

2. The method of claim 1, wherein at least one of the conductors is located in or adjacent to a water supply well to provide the additional amounts of water required to migrate towards the other electrical conductors located in the liquefiable isolation layer to ensure the pore water pressure in the isolation layer raises sufficiently high to induce liquefaction of the isolation layer beneath the structure during the earthquake event.

3. The method of claim 1, wherein at least one of the conductors is porous or open to transmit water and is connected to a supply of water to provide the additional amounts of water required to migrate towards the other electrical conductors located in the liquefiable isolation layer to ensure the pore water pressure in the isolation layer raises sufficiently high to induce liquefaction of the isolation layer beneath the structure during the earthquake event.

4. The method of claim 1, wherein the method further comprises maintaining the connection of the dc power source to the array of electrical conductors for a predetermined time relating to the expected duration of the earthquake event.

5. The method of claim 1, wherein the earth's movement is monitored by an accelerometer which produces output signals corresponding to the earth's movement and the onset of an earthquake event is predicted by means of a computer running an algorithm using the output signals.

6. The method of claim 1, wherein the earth's movement is monitored and the onset of earthquake events is predicted by a mechanical device comprising a pendulum mass that actuates or de-actuates a switch when subjected to early arrival ground motions preceding the onset of an earthquake event.

7. The method of claim 1, wherein the earth's movement is monitored and the onset of earthquake events is predicted by a mechanical device comprising a sliding mass that actuates or de-actuates a switch when subjected to early arrival ground motions preceding the onset of an earthquake event.

8. The method of claim 1, wherein the earth's movement is monitored and the onset of earthquake events is predicted by a mechanical device consisting of a rotating/rolling mass that actuates or de-actuates a switch when subjected to early arrival ground motions preceding the onset of an earthquake event.

9. The method of claim 1, wherein the isolation layer is located at a depth below the ground surface and has a thickness that is equal to less than $\frac{1}{5}$ of the depth of the isolation layer below the ground surface.

10. The method of claim 1, wherein the soil within the isolation layer consists of fine grained saturated soils, such as fine sands, silty sands, silts and clayey soils.

11. The method of claim 10, wherein the soil within the isolation layer consists of soils that are classified as d10 (10% finer) being less or equal to a grain size of 0.05 mm.

12. The method of claim 1, wherein the method further comprises connecting the source of dc power to a second array of electrical conductors located in the soil beneath the structure, below the ground water table, and above the isolation layer so that in response to connecting the dc power to the second array of electrical conductors in the soil, the ground water moves away from beneath the structure, the pore water pressure beneath the structure is lowered, and preferential earthquake induced liquefaction of the soil beneath the structure is inhibited.

13. A system of seismically isolating a structure on the ground surface during an earthquake event comprising:
    (a) a dc power source;
    (b) an array of electrical conductors located in the soil beneath the structure and below the ground water table;
    (c) a switch interconnecting the dc power source and the array of electrical conductors; and
    (d) a seismic monitor for monitoring the movement of the earth adjacent the structure, and from the movement, predicting the onset of an earthquake event,
wherein the seismic monitor activates the switch in response to predicting the onset of an earthquake event so that the dc power source is connected to the conductors thereby causing the ground water to move towards an isolation layer beneath the structure, raising the pore water pressure within the isolation layer to ensure the isolation layer liquefies during the earthquake event and thus isolates the structure from the upwardly propagating earthquake induced ground motions.

14. The system of claim 13, wherein at least one of the conductors is located in or adjacent to a water supply well to provide the additional amounts of water required to migrate towards the other electrical conductors located in the liquefiable isolation layer to ensure the pore water pressure in the isolation layer raises sufficiently high to induce liquefaction of the isolation layer beneath the structure during the earthquake event.

15. The system of claim 13, wherein at least one of the conductors is porous or open to transmit water and is connected to a supply of water to provide the additional amounts of water required to migrate towards the other electrical conductors located in the liquefiable isolation layer to ensure the pore water pressure in the isolation layer raises sufficiently high to induce liquefaction of the isolation layer beneath the structure during the earthquake event.

16. The system of claim 13, wherein the system further comprises a timer, connected between the seismic monitor and the switch, which timer is activated by the seismic monitor in response to the prediction of the onset of an earthquake event, and which timer maintains the connection of the dc power source to the array of electrical conductors for a predetermined time relating the expected duration of the earthquake event.

17. The system of claim 13, wherein the seismic monitor comprises an accelerometer for monitoring the earth's movement and for producing output signals corresponding to such movement and a computer adapted to run an algorithm which uses the output signals to predict the onset of an earthquake event.

18. The system of claim 13, wherein the seismic monitor comprises a mechanical device comprising a pendulum mass that actuates or de-actuates a switch when subjected to early arrival ground motions preceding the onset of an earthquake event.

19. The system of claim 13, wherein the seismic monitor comprises a mechanical device comprising a sliding mass that actuates or de-actuates a switch when subjected to early arrival ground motions preceding the onset of an earthquake event.

20. The system of claim 13, wherein the seismic monitor comprises a mechanical device comprising a rotating/rolling mass that actuates or de-actuates a switch when subjected to early arrival ground motions preceding the onset of an earthquake event.

21. The system of claim 13, wherein the first array of conductors opposition to define the boundaries of the isolation layer which is thereby located at a depth below the ground surface and has a thickness that is less than ⅓ of the depth of the isolation layer below the ground surface.

22. The system of claim 13, wherein the soil within the isolation layer consists of fine grained saturated soils, such as fine sands, silty sands, silts and clayey soils.

23. The system of claim 22, wherein the soil within the isolation layer consists of soils that are classified as d10 (10% finer) being less or equal to a grain size of 0.05 mm.

24. The system of claim 13, wherein the system further comprises a second array of electrical conductors connected to the source of dc power and located in the soil beneath the structure, below the ground water table, and above the isolation layer so that in response to connecting the dc power to the second array of electrical conductors in the soil, the ground water moves away from beneath the structure, the pore water pressure beneath the structure is lowered, and preferential earthquake induced liquefaction of the soil beneath the structure is inhibited.

* * * * *